Oct. 8, 1940.  E. F. LOWEKE  2,216,847
FLUID PRESSURE BRAKING SYSTEM
Filed Dec. 6, 1937
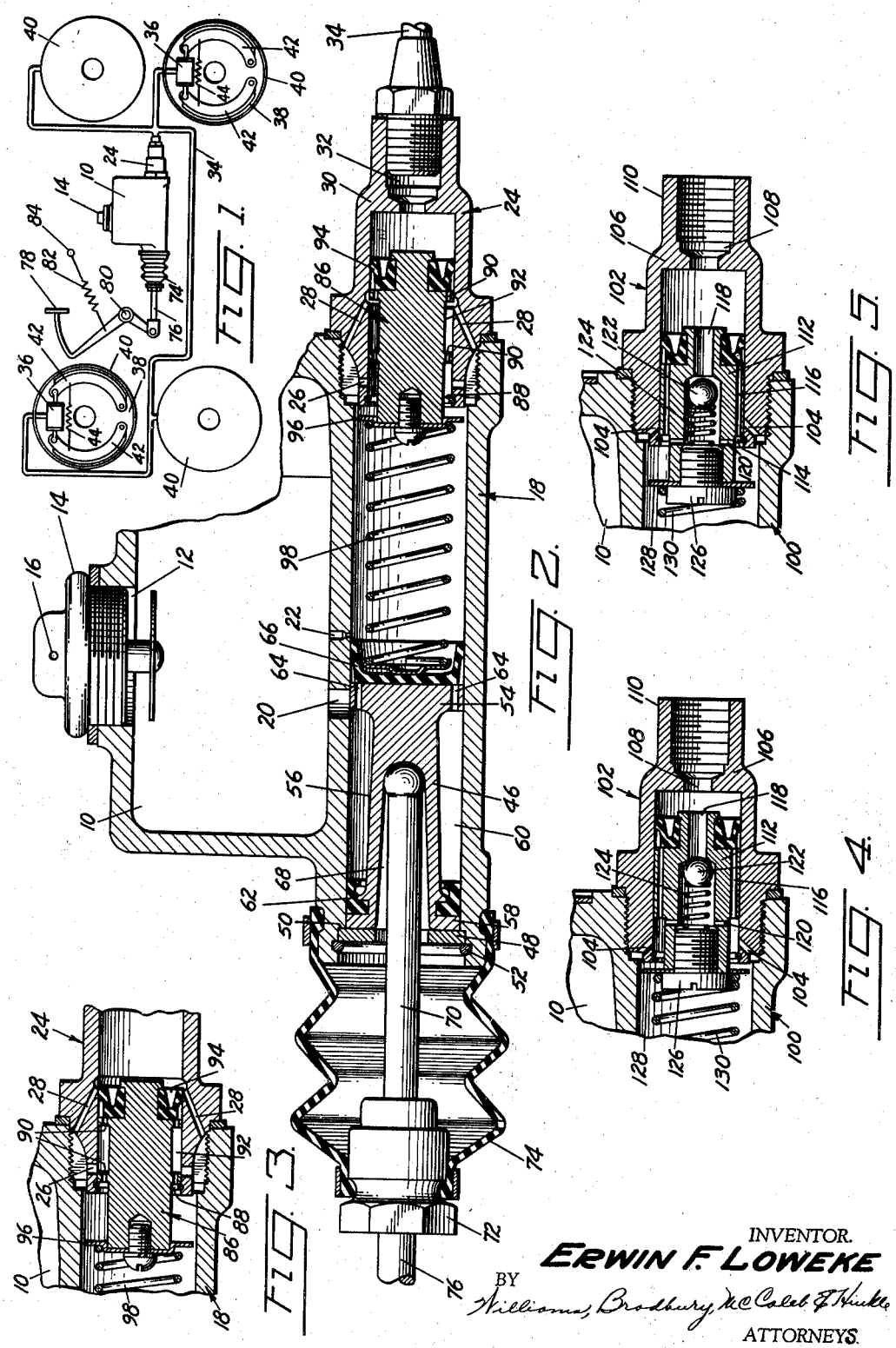
INVENTOR.
ERWIN F. LOWEKE
BY
Williams, Bradbury, McCaleb & Hinkle
ATTORNEYS.

Patented Oct. 8, 1940

2,216,847

UNITED STATES PATENT OFFICE 2,216,847

FLUID PRESSURE BRAKING SYSTEM

Erwin F. Loweke, Detroit, Mich., assignor to Hydraulic Brake Company, Detroit, Mich., a corporation of California Application December 6, 1937, Serial No. 178,244

3 Claims. (Cl. 60—54.5)

This invention relates to fluid pressure braking systems, and more particularly to fluid pressure producing devices for such systems.

Broadly the invention comprehends a fluid pressure braking system including a fluid pressure producing device having means for maintaining a predetermined pressure on the fluid in the system.

An object of the invention is to provide a fluid pressure producing device operative to maintain a positive pressure on the fluid in the system when the device is at rest.

Another object of the invention is to provide a fluid pressure producing device operative to maintain a predetermined pressure on the fluid in the system and to compensate for loss of fluid due to leakage and for expansion or contraction of the fluid due to temperature changes.

Other objects and advantages of the invention will appear from the following description taken in connection with the drawings forming a part of this specification, and in which—

Fig. 1 is a diagrammatical illustration of a fluid pressure braking system embodying the invention;

Fig. 2 is a vertical sectional view of the fluid pressure producing device;

Fig. 3 is a fragmentary view of the valve mechanism for maintaining a predetermined pressure on the fluid in the system;

Fig. 4 is a detailed view illustrating a modified form of the valve mechanism showing the valve in open position; and Fig. 5 is a similar view of the valve mechanism illustrating the valve in closed position.

Referring to the drawing for more specific details of the invention, 10 represents a fluid reservoir having a filling opening 12 normally closed as by a plug 14 provided with suitable openings 16 for venting the reservoir to the atmosphere.

A cylinder 18 at the base of the reservoir 10 has ports 20 and 22 providing communications between the cylinder and the reservoir. The cylinder 18 is open at one of its ends and has suitably secured in its other end a cylinder 24 of smaller diameter than the cylinder 18. The small cylinder 24 has a plurality of ports 26 and 28, providing communications between the cylinders 18 and 24, and a head 30 provided with a discharge port 32.

A fluid pressure delivery pipe or conduit 34 suitably connected to the discharge port 32 has branches connected respectively to fluid pressure actuated motors 36. The motors are arranged in pairs, one pair for actuating the brakes associated with the front wheels of a vehicle and another pair for actuating the brakes associated with the rear wheels of the vehicle.

The brakes are of a preferred type each including a fixed support or backing plate 38, a rotatable drum 40 associated with the backing plate, a pair of corresponding interchangeable friction elements or shoes 42 arranged on the backing plate for cooperation with the drum, and a motor corresponding to the motors 36 mounted on the backing plate between the shoes and operative to actuate the shoes into engagement with the drum against the resistance of a retractile spring 44 connecting the shoes.

A piston 46 reciprocable in the cylinder 18 is held against displacement by an annular washer 48 secured on a shoulder 50 in the open end of the cylinder by a retaining ring 52 fitted in a groove in the wall of the cylinder. The piston includes a head 54, a body portion 56, and a skirt 58. This body portion is reduced in diameter to provide in conjunction with the cylinder an annular chamber 60, and a sealing cup 62 fitted on the skirt 58 of the piston inhibits seepage of fluid from the annular chamber 60 past the piston. The head 54 has a plurality of passages 64 therethrough providing communications between the annular chamber 60 and that portion of the cylinder forward of the piston, and a sealing cup 66 seated on the head of the piston controls the passages.

The piston has in its back a recess 68 receiving one end of a thrust pin 70, the other end of which has thereon a coupling 72, and a flexible boot 74 sleeved on the thrust pin connects the coupling to the open end of the cylinder for the exclusion of dust and other foreign substances from the cylinder. The coupling 72 is connected as by a rod 76 to a foot pedal lever 78 pivotally mounted on a stub shaft 80, and a retractile spring 82 connects the foot pedal lever to a fixed support 84.

Mounted for reciprocation in the cylinder 24 is a piston 86 held against displacement by a retaining ring 88 seated in a groove in the wall of the cylinder adjacent the open end thereof. This piston has passages 90 therethrough providing communications between the cylinder 18 and that portion of the cylinder 24 forward of the piston 86 and a circumferential groove or channel 92 intersecting the passages 90 so as to reduce the resistance to the flow of fluid through the passages, and suitably attached to the head of the piston is a sealing cup 94 for control of the passages 90.

Suitably attached to the back of the piston is a combined spring seat and stop 96 for limiting the movement of the piston 86 in one direction, and interposed between this spring seat and the sealing cup 66 is a spring 98. This spring imposes a predetermined load on the piston 86 and also serves to return the piston 46 to its retracted position. It will be observed that changes in pressure in that portion of the system forward of the piston 92, due to leakage or to contraction or expansion of the fluid, such changes are compensated for by movement of the piston 92 to relieve or increase the pressure.

In a normal operation, upon depressing the foot pedal lever 78, force is transmitted from the lever through the rod 76 and the thrust pin 70 to the piston 46 resulting in moving the piston on its compression stroke. During the initial movement of the piston 46 on its compression stroke, the sealing cup 66 on the head 54 of the piston 46 closes the port 22, and as the piston proceeds on its compression stroke the fluid in the cylinder 18 forward of the head 54 is displaced therefrom through the ports 26 into the cylinder 24, thence through the passages 90 in the piston 86, past the sealing cup 94, into that portion of the cylinder 24 forward of the piston 86, and thence through the discharge port 32 and fluid pressure delivery pipe or conduit 34 and its respective branches into the fluid pressure actuated motors 36, causing actuation of the motors resulting in actuating the shoes into engagement with the drums 40 against the resistance of the retractile spring 44.

Upon completion of a braking operation, the operator releases the applied force on the foot pedal lever 78, whereupon the lever is returned to its normal or retracted position under the influence of the retractile spring 82 connecting the foot pedal lever to the fixed support 84. As the foot pedal lever moves to its retracted position the rod 72 and the thrust pin 70 are retracted, resulting in release of the piston 46 and return of the piston to its retracted position under the influence of the spring 98.

As the piston 46 returns to its retracted position a partial vacuum is created in the cylinder 18, resulting in drawing fluid from the reservoir 10 through the ports 20 into the annular chamber 60, thence through the passages 64 in the head of the piston 46, past the sealing cup 66, into that portion of the cylinder 18 forward of the piston head 54, completely filling the cylinder, and simultaneously therewith the fluid in the fluid pressure delivery pipe or conduit 34 and its respective branches and the fluid pressure actuated motors 36 connected to the branches is returning to the cylinder 24 under the influence of the retractile spring 44 connected between the shoes 42 of the respective brake structures.

As the fluid returns to the cylinder 24 from the motors and fluid pressure delivery pipes, the piston 86 is retracted due to the pressure on the fluid in the cylinder 24 until the cup 94 on the piston 86 uncovers the passages 28, whereupon the fluid in the cylinder 24 is displaced therefrom through the passages 28 into the cylinder 18. The pressure on the fluid remaining in the cylinder 24 is dependent upon a load on the spring 98. As soon as the pressure in the cylinder 24 is reduced, either by leakage or contraction, to a degree slightly below the load imposed on the piston 86 by the spring 98, the piston 86 advances sufficiently for the cup 94 on the head thereof to close the passages 28 so as to maintain a constant predetermined pressure on the fluid in that portion of the system forward of the piston 86 in spite of contraction of the fluid in the motors 36 as they cool after a protracted application of the brakes. The fluid returned to the cylinder 18 may be in excess of the quantity required to completely fill this cylinder, and in that event the excess fluid is displaced from the cylinder 18 through the compensating port 22 into the reservoir.

A modification of the invention is illustrated in Figs. 4 and 5. This modification pertains entirely to the valve mechanism for maintaining a predetermined pressure on the fluid pressure delivery pipe and the apparatus connected thereby to the fluid pressure producing device. In this modification a cylinder 100 corresponding to the cylinder 18 illustrated in the preferred embodiment of the invention has fitted in one end thereof a cylinder 102 of smaller diameter than the cylinder 100. The cylinder 102 has a plurality of ports 104 providing communications between the cylinder 102 and the cylinder 100. The cylinder 102 also has a head 106 provided with a discharge port 108 coextensive with a sleeve 110 to which may be connected a fluid pressure delivery pipe or conduit corresponding to the fluid pressure delivery pipe or conduit 34 illustrated in the preferred embodiment of the invention.

A piston 112 reciprocable in the cylinder 102 is retained against displacement as by a retaining ring 114 seated in a groove in the wall of the cylinder adjacent the open end thereof. This piston has a plurality of spaced passages 116 therethrough providing communications between the cylinder 100 and the cylinder 102, and a sealing cup suitably attached to the head of the piston 112 controls the passages 116.

The piston 112 also has an axial passage 118 and a plurality of diametral passages 120 providing communications between the axial passage 118 and that portion of the cylinder 102 back of the piston 112. The passage 118 is controlled as by a ball valve 122 urged to its seat by a spring 124 interposed between the valve 122, and a plug 126 closing that end of the passage 118 adjacent the back of the piston. The plug 126 also serves to retain a washer 128 on the back of the piston. This washer is adapted to engage the open end of the cylinder 24 so as to limit the movement of the piston 112. The washer 128 also serves as a suitable rest for a spring 130 corresponding to the spring 98 of the preferred embodiment of the invention.

The operation of this modification is substantially the same as that of the preferred embodiment of the invention, and, accordingly, needs but little explanation. In this embodiment of the invention the piston 112 under the influence of the spring 130 maintains a predetermined pressure on the fluid in the cylinder 102, and in the fluid pressure delivery pipes and the apparatus connected by the pipes to the cylinder 102. Upon a drop in the pressure on the fluid in the cylinder 102, the piston 116 is advanced under the influence of the spring 130, and upon an increase in pressure on the fluid in the cylinder 102, the valve 122 opens to relieve the pressure.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A fluid pressure system comprising a compression cylinder having a large chamber, a first piston reciprocable therein, means for reciprocating said piston, a small chamber communicating with the large chamber, a floating piston in the small chamber, a motor cylinder, a fluid conduit connecting said motor cylinder and said small chamber, yielding means resisting operation of said motor cylinder, means for by-passing fluid past the floating piston, means for limiting forward movement of the floating piston to an amount materially less than the forward movement of said first piston, and a resilient member between the pistons for coacting with said yieldable means to maintain fluid pressure in said conduit and motor cylinder.

2. A fluid pressure system comprising a compression cylinder, a first piston reciprocable therein, means for reciprocating said piston, a floating piston in the cylinder, a motor cylinder, a fluid conduit connecting said cylinders, yielding means resisting operation of said motor cylinder, means for by-passing fluid past the floating piston, a head on the floating piston for limiting forward movement thereof to an amount materially less than the forward movement of said first piston, and a resilient member between the pistons for coacting with said yieldable means to maintain fluid pressure in said conduit and motor cylinder.

3. A fluid pressure producing system comprising a reservoir, a cylinder supplied therefrom including a large chamber and a small chamber arranged concentrically to and opening into the large chamber, an actuating piston in the large chamber, a floating piston in the small chamber having spaced passages therethrough providing for the flow of fluid from the large chamber into the small chamber, an axial passage providing for the flow of fluid from the small chamber into the large chamber, means carried by the floating piston for controlling the spaced and axial passages, means for limiting movement of the floating piston in one direction to an amount materially less than the corresponding movement of said actuating piston, a resilient member between the pistons, a motor cylinder, a conduit connecting said motor cylinder with said small chamber, and a return spring for said motor cylinder coacting with said tension member to maintain fluid pressure in said motor cylinder and conduit.

ERWIN F. LOWEKE.